United States Patent Office 3,454,557
Patented July 8, 1969

---

3,454,557
6-(α-GUANIDINO ACYLAMINO)-PENICILLANIC ACID COMPOUNDS
Arthur A. Patchett, Cranford, and Edward F. Rogers, Middletown, N.J., and William J. Leanza, Staten Island, N.Y., assignors to Merck & Co., Inc., Rahway, N.J., a corporation of New Jersey
No Drawing. Continuation-in-part of application Ser. No. 207,036, July 2, 1962. This application July 2, 1964, Ser. No. 380,052
Int. Cl. C07d 99/16, 99/22; C07c 129/12
U.S. Cl. 260—239.1
20 Claims

ABSTRACT OF THE DISCLOSURE

Penicillins are disclosed wherein the α-carbon on the acyl group contains a guanidine radical and nontoxic salts and esters thereof. The compounds have antibacterial activity.

---

This invention relates to new antibiotic compounds and methods of preparing the same. More particularly, it is concerned with new penicillins, salts thereof and processes for preparing these products.

This application is a continuation-in-part of our copending application Ser. No. 207,036 filed July 2, 1962 and now abandoned.

The penicillins having the general formula:

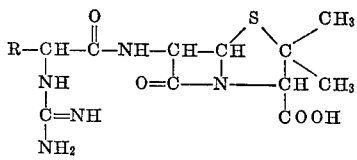

wherein R represents an organic radical, have been found to be invaluable in the therapy of infections, particularly those due to Gram-positive bacteria. Thus, penicillins such as benzylpenicillin and phenoxymethylpenicillin are widely used in the treatment of various infections. Although penicillins have found widespread use, the presently-known penicillins do suffer from one or more disadvantages. For example, some of the penicillins such as benzylpenicillin are unstable under acid conditions and are therefore unsatisfactory for oral administration. Some of the penicillins are ineffective against resistant strains of bacteria and the use of these penicillins must therefore be limited in the treatment of infections caused by bacteria susceptible to the action of the penicillin. Accordingly, the search has continued to find other penicillins which do not possess the disadvantages of the known penicillins.

It is an object of this invention to provide acid-stable penicillins and their salts and esters which are effective against both penicillin-resistant and penicillin-sensitive microorganisms.

Another object is to provide processes for the preparation of such penicillins, salts and esters.

Other objects will be apparent from the detailed description of this invention hereinafter provided.

In accordance with this invention, it is now found that penicillins wherein the α-carbon of the acyl group contains a guanidine radical and non-toxic salts and esters thereof are valuable antibacterial products. Certain of these products, which may also be termed 6-(α-guanidinoacylamino)-penicillanic acid, or, more specifically, 6-(α-guanidinoacetamido)-penicillanic acid, in addition to having pronounced antibacterial activity, are stable in aqueous acidic solutions and are active against a variety of penicillin-resistant as well as penicillin-sensitive microorganisms. These penicillins are of the formula:

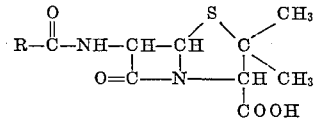

wherein R represents hydrogen or an organic radical such as an alkyl, aryl, aralkyl, cycloalkyl or a heterocyclic group and certain substituted derivatives thereof. A preferred class of the new penicillins of the present invention are 6 - (α - guanidinoacetamido) - penicillanic acids and derivatives wherein the carbon bearing the guanidino substituent is further substituted by an aryl, aralkyl, halophenyl, aminophenyl, alkanoylaminophenyl, loweralkoxyphenyl, alkyl, bicyclicaryl, alicyclic, thienyl, loweralkyl, substituted thienyl, pyridyl, loweralkyl substituted pyridyl, pyrrolyl, loweralkyl substituted pyrrolyl, or furyl radical or, more particularly, by a phenyl, benzyl, p-chlorophenyl, p-aminophenyl, p-alkanoylaminophenyl, p-hydroxyphenyl, p-loweralkoxyphenyl, loweralkyl, naphthyl, cyclohexyl, thienyl, pyridyl, pyrrolyl, or furyl radical.

These new penicillins may be used in therapy as such, or may be converted to non-toxic acid addition salts. In addition, other desirable forms in which the novel penicillins of the present invention may be employed are penicillin esters such as the phenacyl, the carbethoxymethyl, the acetonyl, the benzyl, the allyl, the dialkylaminoalkyl, e.g., the diethylaminoethyl, and the loweralkyl, e.g., the methyl and ethyl esters wherein the carboxyl group of the penicillin molecule is esterified.

The new penicillins of the present invention are prepared by reacting a suitable ester of 6-aminopenicillanic acid with a guanidino-substituted acetic acid which may bear other substituents attached to the guanidino-substituted carbon to produce the corresponding ester of the 6-(α-guanidinoacetamido) - penicillanic acid and then removing the ester grouping by catalytic hydrogenation to obtain the desired free 6-(α-guanidinoacetamido)-penicillanic acid. Alternatively, the new penicillin esters may be used as antibacterial agents without conversion to the penicillanic acid or salt thereof by hydrogenation.

Esters of 6-aminopenicillanic acid suitable for use in carrying out the processes of this invention are those which can be readily cleaved by catalytic hydrogenation. Suitable esters of 6-aminopenicillanic acid that might be mentioned include allyl, benzyl, diphenylmethyl, and the like.

In accordance with the present invention, the new guanidinopenicillin esters are prepared by first esterifying 6-aminopenicillanic acid or a salt thereof to obtain an ester of 6-aminopenicillanic acid and subsequently reacting the 6-aminopenicillanic acid ester with a selected guanidino acetic acid to produce the corresponding ester of a guanidinopenicillin. In one method of esterification, the 6-aminopenicillanic acid is contacted with a diazo compound such as a diazoalkane or a diazoaralkane, e.g., diazomethane, diazoethane or phenyldiazomethane in the presence of an inert solvent or liquid diluent for the reacting species to produce the desired 6-aminopenicillanic acid ester. In a preferred method of preparing the 6-aminopenicillanic acid ester, a solution of 6-aminopenicillanic acid or a salt thereof is contacted with an equimolar amount of an organic halo compound, preferably in the presence of a hydrogen ion acceptor such as a tertiary amine, e.g., triethylamine, pyridine, and the like. Thus, 6-aminopenicillanic acid is reacted with an organic halo compound, preferably an organic bromo compound such as allyl bromide, benzyl bromide, bromoacetophenone, ethylbromoacetate, bromoacetone or benzhydryl bromide, although the corresponding chlorides and iodides may be used with facility. The products formed are the corresponding allyl, benzyl, phenacyl, carboxymethyl, acetonyl and benzhydryl esters of 6-aminopenicillanic acid. The new guanidinopenicillin esters may also be prepared by the direct esterification of the free penicillin acid with the selected alcohol. Thus, reaction of an acid salt of 6-(α-guanidinoacetamido)-penicillanic acid with an alcohol such as diethylaminoethanol in the presence of a carbodiimide produces the corresponding guanidinopenicillin ester, for example, the diethylaminoethyl ester of α-guanidinobenzylpenicillin.

The α-guanidinoacetic acids used as acylating agents in the preparation of the new penicillins of the present invention have the formula:

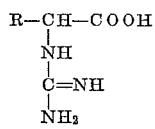

wherein the R substituent is the same as is defined above. In preparing the guanidino substituted carboxylic acids used as the acylating agent, the appropriate aminocarboxylic acid is reacted with a selected O-alkylisourea, an S-alkylisothionitrourea followed by hydrogenation or an isothiourea S-alkyl ether and the resulting guanidinoalkanoic acid recovered from the reaction mixture. In this manner, for example, α-guanidinophenylacetic acid is prepared by the reaction of α-aminophenylacetic acid with O-methylisourea; α-guanidino-β-phenylpropionic acid is prepared by reaction of α-amino-β-phenylpropionic acid and the methyl ether of isourea; α-guanidinopropionic acid is prepared from α-aminopropionic acid and S-methylisothiourea; α-guanidino-p-methoxyphenylacetic acid is prepared by the reaction of α-amino-p-methoxyphenylacetic acid with O-methylisourea; α-guanidino-α-furylacetic acid is prepared from α-aminofurylacetic acid and the methyl ether of isourea; α-guanidinocyclohexylacetic acid is prepared by the reaction of α-aminocyclohexylacetic acid with O-methylisourea hydrochloride; and α-guanidinocyclohexylacetic acid is obtained from α-aminocyclohexylacetic acid by reaction with O-methylisourea hydrochloride in aqueous ammonia. In a similar manner, α-guanidino-(3-thienyl)-acetic acid is prepared by the reaction of α-(3-thienyl)-aminoacetic acid with O-methylisourea hydrochloride; α-guanidino-(2-thienyl)-acetic acid is prepared by the reaction of α-(2-thienyl)-aminoacetic acid with O-methylisourea hydrochloride; α-guanidino-(4-pyridyl)-acetic acid is prepared by the reaction of α-(4-pyridyl)-aminoacetic acid with O-methylisourea hydrochloride; and α-guanidino-(3-pyridyl)-acetic acid is prepared by the reaction of α-(3-pyridyl)-aminoacetic acid with O-methylisourea hydrochloride.

In those instances in which the guanidino function is attached to an asymmetric carbon, the possibility of optical isomers or diastereomers exists. Where the guanidino substituted carboxylic acid used as the acylating agent is derived from an optically active amino acid whose optical activity is due in part to the presence of an amino substituent attached to the asymmetric carbon, the resulting guanidino substituted carboxylic acid will retain the optical activity of the parent amino acid compound. Thus, where the parent amino acid is an optically inactive racemic mixture of the optically active form, the resulting guanidino acid will likewise be an optically inactive racemic mixture. Either the optically active forms or the racemic forms of the guanidinocarboxylic acid may be reacted with 6-aminopenicillanic acid derivatives to produce the α-guanidinopenicillin compounds. Of the optically active α-guanidinobenzylpenicillins, the 6-[D(—)α-guanidinophenylacetamido]-penicillanic acid is more active and, therefore, represents a preferred embodiment of the present invention.

The reaction of the 6-aminopenicillanic acid ester and the α-guanidino substituted organic acid is conveniently carried out by contacting the reactants in the presence of a carbodiimide such as 1,3-dicyclohexyl carbodiimide or 1,3-diisopropyl carbodiimide, in the presence of a suitable solvent at room temperature. After completion of the reaction the urea formed from the dicarbodiimide is separated from the reaction mixture and the desired penicillin ester is recovered from the resulting solution in accordance with methods well-known in this art.

The ester of the new penicillin so obtained is readily converted to the free acid by catalytic hydrogenation. This catalytic hydrogenation is preferably carried out using a noble metal catalyst such as palladium, platinum or rhodium; preferably supported on an inert carrier such as carbon, barium carbonate, diatomaceous earth, and the like. After completion of the hydrogenation the free penicillanic acid is recovered from the hydrogenation reaction mixture by procedures know in the art.

Examples of α-guanidinopenicillins that are prepared according to the processes described hereinabove include α - guanidinobenzylpenicillin, α - guanidino-β-phenethylpenicillin, α-guanidinomethylpenicillin, α-guanidino-1-naphthylmethylpenicillin, α-guanidino-p-methoxybenzylpenicillin, α-guanidinofurylmethylpenicillin, α-guanidinocyclohexylmethylpenicillin, α - guanidinoheptylpenicillin, α-guanidino-p-chlorophenylbenzylpenicillin, α-guanidino-p - aminophenylbenzylpenicillin, α - guanidino-p-ethoxybenzylpenicillin, α - guanidino-(2-thienyl)-methylpenicillin, α - gaunidino-(3-thienyl)-methylpenicillin, α-guanidino - (3-pyridyl)-methylpenicillin, α-guanidino-(4-pyridyl) - methylpenicillin, α-guanidino-(2-pyrrolyl)-methylpenicillin, α-guanidinoethylpenicillin, α-guanidino sec. butylpenicillin, α-guanidinoisobutylmethylpenicillin and α - guanido - α - isopropylmethylpenicillin and the corresponding allyl, benzyl, phenacyl, diethylaminoethyl, methyl, acetonyl and carbethoxymethyl esters thereof.

The new penicillins may be obtained in the form of their inner salts or they can be reacted with acids to obtain the corresponding penicillin acid salts. Included within the scope of this invention are the non-toxic acid addition salts including mineral acid addition salts such as the hydrochlordes, hydrobromides, hydroiodides, sulfate and the phosphates, as well as such organic acid addition salts as the maleates, acetates, citrates, oxalates, succinates, benzoates, tartrates, fumarates, malates, mandelates, ascorbates, and the like. The inner salts and the non-toxic addition salts can be admixed with suitable non-toxic liquid or solid pharmaceutical carriers for administration to man and animals. These pharmaceutical preparations can contain other active therapeutic agents, and may be administered either orally or parenterally.

The new penicillins and their non-toxic salts and esters are valuable antibacterial agents which are useful for the sterilization of equipment. They are also useful as nutritional supplements in animal feeds. In addition, they are useful therapeutic agents in poultry and other animals, including man, in the treatment especially of infections caused by susceptible Gram-positive and Gram-negative bacteria.

The following examples are provided as illustrations of the methods of preparing the novel penicillins and the non-toxic salts thereof.

EXAMPLE 1

Preparation of 6-[D(—)α-guanidinophenylacetamido] penicillanic acid

To a solution of 0.3 g. of benzyl-6-aminopenicillanate and 0.25 g. of dicyclohexylcarbodiimide in 3 ml. of methylene chloride is added dropwise with stirring a solution of 0.23 g. of D-α-guanidinophenylacetic acid hydrochloride in 1 ml. of dimethylformamide during a period of 5 minutes. After standing at room temperature for 30 minutes the solution is cooled and the precipitate of dicyclohexylurea filtered off. The filtrate is diluted with 50 ml. of ether and the supernatant liquid decanted from the precipitated gum. Another 25 ml. of ether is added to the gum which is then rubbed with a spatula until it solidifies. The solid 6-[D(—)α-guanidinophenylacetamido]-penicillanic acid benzyl ester hydrochloride is filtered off and washed with ether. (Wt. 0.5 g., M.P. 75–135° C. (grad. dec.).) This is used in the reduction step without further purification.

The benzyl-6-aminopenicillanate is prepared as follows: Finely ground 6-aminopenicillanic acid (2 g.) is added to a solution of 1 g. of phenyldiazomethane in 10 ml. of methylene chloride and 3 ml. of methanol. The suspension is stirred for 3 hours during which nitrogen is evolved and the initially-red solution decolorizes. The mixture is diluted with 30 ml. of ether and unreacted 6-aminopenicillanic acid (0.5 g.) filtered off. To the filtrate is added an anhydrous solution of hydrogen chloride in ether dropwise until further addition gives no more precipitate. The precipitated benzyl-6-aminopenicillanate hydrochloride (2.2 g.) is filtered off and washed with ether. The precipitate is shaken with 30 ml. of ether and a slight excess of aqueous sodium bicarbonate solution and the ethereal layer separated and dried over anhydrous magnesium sulfate. Evaporation of the ether leaves an oily residue of benzyl-6-aminopenicillanate. For purification, the oily residue is dissolved in methanol and a solution of oxalic acid hydrate in methanol is added. The precipitated oxalate salt of benzyl-6-aminopenicillanate is filtered off and washed with ether, M.P. 133–134° C. (dec.). The oxalate salt is treated similarly to the hydrochloride salt above with ether and sodium bicarbonate solution to obtain benzyl-6-aminopenicillanate as white crystals, M.P. 82–83° C.

The D-α-guanidinophenylacetic acid hydrochloride is prepared as follows: 10 g. of D-α-aminophenylacetic acid is dissolved in 200 ml. of water and 60 ml. of 28% aqueous ammonia. Twenty grams of O-methylisourea ether hydrochloride is added and the solution allowed to stand at room temperature for 24 hours. The precipitate of D-α-guanidinophenylacetic acid is filtered off and washed with water. Yield, 2.5 g., M.P. 225° C., solidifies and remelts at about 260° C. with decomposition.

The hydrochloride salt is prepared by dissolving the acid in dilute hydrochloric acid and evaporating the solvent in vacuo. M.P. 157–9° C. with decomposition.

6 - [D(—)α - guanidinophenylacetamido] - penicillanic acid benzyl ester hydrochloride (0.41 g.) is added to a prereduced suspension of 0.1 g. of 10% palladium on charcoal in 10 ml. of 50% methanol and the mixture shaken under hydrogen at room temperature and atmospheric pressure for 45 minutes. The catalyst is filtered off and the filtrate evaporated under reduced pressure. As the methanol evaporates, the 6-[D(—)α-guanidinophenylacetamido]-penicillanic acid crystallizes out of the aqueous acid solution as the inner salt. The precipitation is completed by the addition of 1 ml. of 0.5 N aqueous sodium bicarbonate solution. The precipitate is filtered off, washed with water and with ethanol. M.P. 220° C. (dec.). The product inhibits *Staphylococcus aureus* at a concentration of 0.97 mcg./ml.

EXAMPLE 2

Preparation of α-guanidino-β-phenethylpenicillin

The α-guanidino-β-phenylethylpenicillin benzyl ester hydrochloride is prepared by adding 0.25 g. of DL-α-guanidino-β-phenylpropionic acid hydrochloride to a solution of 0.3 g. of benzyl-6-aminopenicillanate and 0.23 g. of dicyclohexylcarbodiimide in 2 ml. of 1:1 methylene chloride-dimethylformamide. After 30 minutes at room temperature the precipitated dicyclohexylurea is filtered off, and the hydrochloride of α-guanidino-β-phenethylpenicillin benzyl ester precipitated by the addition of ether to the filtrate.

The β-phenyl-α-guanidinopropionic acid is prepared by the reaction of DL-α-amino-β-phenylpropionic acid and O-methylisourea as described in the art.

α-Guanidino-β-phenylethylpenicillin benzyl ester hydrochloride is hydrogenated in the presence of palladium on charcoal catalyst as in Example 1. After filtration of the catalyst the filtrate is neutralized with one equivalent sodium bicarbonate solution and evaporated to dryness under reduced pressure. The residue contains α-guanidino-β-phenethylpenicillin.

EXAMPLE 3

Preparation of α-guanidinomethylpenicillin

Guanidinomethylpenicillin benzyl ester hydrochloride is prepared as follows: a solution of 0.464 g. of guanidinoacetic acid hydrochloride in 3 ml. of dimethylformamide is added to a solution of 0.92 g. of benzyl-6-aminopenicillanate and 0.7 g. of dicyclohexylcarbodiimide in 2 ml. of dimethylformamide. After standing for 20 minutes the mixture is cooled and the precipitate of dicyclohexylurea is filtered off. The addition of ether to the filtrate as in Example 1 yields 1.2 g. of guanidinomethylpenicillin benzyl ester hydrochloride.

A solution of 0.886 g. of guanidinomethylpenicillin benzyl ester hydrochloride in 20 ml. of 90% aqueous methanol is hydrogenated in the presence of 0.4 g. of 10% palladium on carbon catalyst for two hours. After filtration of the catalyst, the filtrate is neutralized with sodium bicarbonate solution, then frozen and lyophilized. The solid residue which contains guanidinomethylpenicillin inhibits *Staphylococcus aureus* at a concentration of 1.9 mcg./ml.

EXAMPLE 4

Preparation of α-guanidino-1-naphthylmethylpenicillin

The hydrochloride salt of α-guanidino-1-naphthylmethylpenicillin benzyl ester is prepared as follows: a solution of DL-α-guanidino-1-naphthylacetic acid hydrochloride (0.56 g.) in 2 ml. of dimethylformamide is slowly added to a solution of benzyl-6-aminopenicillanate (0.6 g.) and dicyclohexylcarbodiimide (0.5 g.) in 5 ml. of methylene chloride. The mixture is allowed to stand at room temperature for 45 minutes, cooled in ice for 15 minutes and then filtered. To the filtrate is added 100 ml. of ethyl ether and the precipitated α-guanidino-1-naphthylmethylpenicillin benzyl ester hydrochloride is filtered off and washed with ether.

The DL-α-guanidino-1-naphthylacetic acid is prepared from the reaction of DL-α-amino-1-naphthylacetic acid with O-methylisourea hydrochloride in aqueous ammonia solution.

A solution of α-guanidino-1-naphthylmethylpenicillin benzyl ester hydrochloride (0.6 g.) in 20 ml. of 80% aqueous methanol is shaken with 0.2 g. of 10% palladium on charcoal catalyst at room temperature and atmospheric pressure until the theoretical amount of hydrogen is absorbed. The catalyst is then filtered off and the filtrate neutralized with one equivalent of sodium bicarbonate solution. The solution is concentrated to a volume of 5 ml. while the product precipitates out of solution. The α-guanidino - 1 - naphthylmethylpenicillin is filtered off, washed with water and then with ether and air dried.

EXAMPLE 5

Preparation of α-guanidino-p-methoxybenzylpencillin

The α-guanidino-p-methoxybenzylpenicillin benzyl ester hydrochloride is obtained by reacting the hydrochloride of α-guanidino-p-methoxyphenylacetic acid with the benzyl ester of 6-aminopenicillanic acid and dicyclohexyldiimide in accordance with the procedure of Example 1. The intermediate α-guanidino-p-methoxyphenylacetic acid required for this reaction is prepared by the reaction of α-amino-p-methoxyphenylacetic acid with O-methylisourea ether hydrochloride in aqueous ammonia.

The hydrochloride salt of α-guanidino-p-methoxybenzylpenicillin benzyl ester is hydrogenated following the procedure described in Example 1 to produce α-guanidino-p-methoxybenzylpenicillin.

EXAMPLE 6

Preparation of α-guanidino-1-furylmethylpencillin

The α-guanidino-1-furylmethylpenicillin benzyl ester hydrochloride is obtained by the reaction of α-guanidinofurylacetic acid hydrochloride with benzyl-6-aminopenicillanate. The hydrochloride salt of α-guanidino-1-furylacetic acid is obtained by reacting α-amino-1-furylacetic acid with O-methylisourea hydrochloride in aqueous ammonia.

The hydrochloride salt of α-guanidino-1-furylmethylpenicillin benzyl ester is hydrogenated in aqueous methanol solution in the presence of palladium on charcoal catalyst at room tempertaure and atmospheric pressure. When the hydrogen uptake is complete the catalyst is filtered off and the filtrate adjusted to pH 7 with sodium bicarbonate solution. The solution is evaporated under reduced pressure leaving the solid α-guanidinofurylmethylpenicillin.

EXAMPLE 7

Preparation of α-guanidinocyclohexylmethylpenicillin

The α-guanidinocyclohexylmethylpenicillin benzyl ester hydrochloride used in this example is prepared by the reaction of α-guanidinocyclohexylacetic acid with 6-aminopenicillanic acid benzyl ester according to the procedure described in Example 1. The α-guanidinocyclohexylacetic acid is obtained by the treatment of a solution of α-aminocyclohexylacetic acid in aqueous ammonia with O-methylisourea hydrochloride.

A solution of α-guanidinocyclohexylmethylpenicillin benzyl ester hydrochloride (0.5 g.) in 15 ml. of 50% aqueous methanol is hydrogenated in the presence of 0.2 g. of 25% palladium on charcoal at room temperature and atmospheric pressure for 45 minutes. The catalyst is filtered off and to the filtrate is added 0.8 g. of sodium acetate. The resutling solution is evaporated under reduced pressure giving a precipitate of α-guanidinocyclohexylmethylpenicillin.

EXAMPLE 8

Preparation of α-guanidinoheptylpenicillin

α-Guanidinoheptylpenicillin is obtained by the hydrogenation of the benzyl ester of α-guanidinoheptylpenicillin hydrochloride in aqueous methanol with palladium on charcoal catalyst at room temperature and under one atmosphere of hydrogen. After filtration of the catalyst the filtrate is neutralized with one equivalent of sodium bicarbonate solution and then evaporated to dryness under reduced pressure to obtain the α-guanidinoheptylpenicillin. The intermediate benzyl ester is obtained by reacting α-guanidino-octanoic acid hydrochloride with benzyl-6-aminopenicillanate and dicyclohexyldiimide following the procedure of Example 1. The α-guanidinooctanoic acid hydrochloride is obtained from α-amino-octanoic acid by the method of the previous example.

EXAMPLE 9

Preparation of α-guanidino(3-thienyl)methylpenicillin

A mixture of 100 g. of α-amino(3-thienyl)acetic acid, 100 g. of S-methylisothiourea sulfate and a solution of 440 ml. of concentrated ammonia in 2 liters of water is stirred vigorously for a period of about 16 hours to form α-guanidino(3-thienyl)acetic acid which crystallizes from solution. The crystalline product is collected by filtration, washed with water and dried.

The α-guanidino(3-thienyl)acetic acid is dissolved in dilute aqueous hydrochloric acid and the formed hydrochloride salt of α-guanidino(3-thienyl)acetic acid is recovered as a residue by evaporation of the water and unreacted hydrogen chloride in vacuum.

To a solution of dicyclohexylcarbodiimide in a mixture of methylene chloride and dimethylformamide is added the hydrochloride salt of α-guanidino(3-thienyl)acetic acid and benzyl-6-aminopenicillanate. The mixture is stirred at 25° C. for approximately 1 hour and the dicyclohexylurea which forms as an insoluble by-product is removed by filtration. The benzyl ester of α-guanidino(3-thienyl)methylpenicillin hydrochloride remaining in the filtrate is precipitated by the addition of ethyl ether and the precipitated product recovered by filtration and dried.

A solution of the hydrochloride of the penicillin benzyl ester in 80% aqueous methanol is hydrogenated at 25° C. at atmospheric pressure in the presence of 10% palladium on charcoal catalyst until 1 mol of hydrogen per mol of penicillin ester is absorbed. The catalyst is then removed from the solution by filtration and the filtrate neutralized with 1 equivalent of sodium bicarbonate solution. The solution is concentrated in vacuo in order to precipitate the product, α-guanidino(3-thienyl)methylpenicillin, from solution.

EXAMPLE 10

Preparation of α-guanidino(2-thienyl)methylpenicillin

Following the procedure of Example 9, reaction of α-amino(2-thienyl)acetic acid with S-methylisothiourea sulfate yields α-guanidino(2-thienyl)acetic acid which is precipitated as the hydrochloride.

Reaction of the hydrochloride with the benzyl ester of 6-aminopenicillanic acid yields the hydrochloride of the benzyl ester of α-guanidino(2-thienyl)methylpenicillin which is converted in accordance with the method of Example 9 by hydrogenolysis and neutralization to α-guanidino(2-thienyl)methylpenicillin which may be recovered by lyophilization.

EXAMPLE 11

Preparation of α-guanidino(4-pyridyl)methylpenicillin

In accordance with the procedures employed in Example 9, α-amino(4-pyridyl)acetic acid is reacted with S-methylisothiourea sulfate to produce α-guanidino(4-pyridyl)acetic acid which is precipitated as the hydrochloride.

Reaction of the hydrochloride in accordance with the procedures of Example 9 in the presence of dicyclohexylcarbodiimide and the benzyl ester of 6-aminopenicillanic acid results in the production of the benzyl ester of α-guanidino(4-pyridyl)methylpenicillin hydrochloride, which is converted to the desired product by hydrogenolysis of the ester and neutralization of the hydrochloride and recovered by precipitation from aqueous solution.

EXAMPLE 12

Preparation of α-guanidino(2-pyrrolyl)methylpenicillin

Following the procedures described in Example 9 and employing as starting material α-amino(2-pyrrolyl)acetic acid, the product obtained after reaction with S-methylisothiourea sulfate is α-guanidino(2-pyrrolyl)acetic acid which is precipitated as the hydrochloride. Reaction of the hydrochloride with the benzyl ester of 6-aminopenicillanic acid in the presence of dicyclohexylcarbodiimide in the manner described in Example 9 results in the production of the benzyl ester of α-guanidino(2-pyrrolyl) methylpenicillin hydrochloride from which the desired product is obtained by hydrogenolysis of the ester and neutralization of the hydrochloride.

EXAMPLE 13

Preparation of α-guanidino-p-chlorobenzylpencillin

In the manner described in Example 9, α-amino-p-chlorophenylacetic acid is reacted in the presence of S-methylisothiourea sulfate to form α-guanidino-p-chlorophenylacetic acid whitch is converted to the corresponding hydrochloride. The resulting hydrochloride is then reacted in solution with the benzyl ester of 6-aminopenicillanic acid in the presence of dicyclohexylcarbodiimide to form the benzyl ester of α-guanidino-p-chlorobenzylpenicillin hydrochloride, from which the desired product is obtained by hydrogenolysis of the ester and neutralization of the acid salt.

EXAMPLE 14

Preparation of α-guanidino-p-aminobenzylpenicillin

Following the procedure of Example 9, p-nitrophenyl-α-aminoacetic acid is reacted with S-methylisothiourea sulfate to obtain α-guanidino-4-nitrophenyl acetic acid which is converted to the hydrochloride salt and, in turn, reacted with the benzyl ester of 6-aminopenicillanic acid. Catalytic reduction of the resulting product, the benzyl ester of α-guanidino-p-nitrobenzylpenicillin, produces the hydrochloride of α-guanidino-p-aminobenzylpencillin.

EXAMPLE 15

Preparation of α-guanidino-2,6-dimethoxybenzylpenicillin

In the manner described in Example 9, 2,6-dimethoxyphenyl-α-amino acetic acid is reacted with S-methylisothiourea sulfate to produce α-guanidino-2,6-dimethoxyphenyl acetic acid which is converted to the corresponding hydrochloride. The hydrochloride is reacted in the presence of dicyclohexylcarbodiimide with ese benzyl ester of 6-aminopenicillanic acid to form the benzyl ester of α-guanidino-2,6-dimethoxybenzylpenicillin hydrochloride from which the desired product is obtained by catalytic hydrogenation of the ester linkage followed by neutralization of the resulting hydrochloride salt.

EXAMPLE 16

Preparation of the diethylaminoethyl ester of 6-[D(−) α-guanidinophenylacetamido]-penicillin acid To a cooled and stirred suspension of 4 grams of 6-[D(−)α-guanidinophenylacetamido]-penicillanic acid and 1.3 cc. of diethylaminoethanol in 20 ml. of dimethylformamide is added 3.9 ml. of 5.1 M hydrogen chloride in dimethylformamide and 3 grams of dicyclohexylcarbodiimide. The mixture is stirred at 0–5° for approximately 3½ hours and the precipitated by-product, dicyclohexylurea, removed from solution by filtration. The product ester remaining in the filtrate is precipitated by addition of a chloroform ether mixture and recovered by filtration. The product is redissolved in dimethylformamide and precipitated as a gum by the addition of chloroform. Trituration of the gum with ether yields the product as a tan amorphous powder which is recovered by filtration and dried.

EXAMPLE 17

Preparation of the phenacyl ester of α-guanidinobenzylpenicillin

A mixture of 2.16 grams of 6-aminopenicillanic acid and 3 ml. of triethylamine in 20 ml. of acetone is stirred for 45 minutes and 2 grams of α-bromoacetophenone added to the mixture and stirring continued for an additional 20 minutes at 25° C. The entire reaction mixture is then cooled to 0–5° to precipitate triethylamine hydrobromide which is removed from the solution by filtration. The filtrate containing the phenacyl ester of 6-aminopenicillanic acid is evaporated and the product is obtained as a residue. The residue is extracted by shaking with a mixture of ether and water saturated with carbon dioxide. The product ester is precipitated from the dried ethereal layer as the hydrochloride by the addition of a solution of dry hydrogen chloride in ether. M.P. 135–140° dec.

The phenacyl ester of 6-aminopenicillanic acid hydrochloride is neutralized with 0.5 M aqueous sodium bicarbonate solution and the resulting ester extracted with methylene chloride solution. To the methylene chloride solution of 6-aminopenicillanic acid phenacyl ester is added an equimolar amount of α-guanidinophenylacetic acid hydrochloride and dicyclohexylcarbodiimide to form the penacyl ester of α-guanidinobenzylpenicillin hydrochloride in solution, which is recovered from the filtrate after removal of the by-product, dicyclohexylurea, by filtration.

EXAMPLE 18

Preparation of the methyl ester of α-guanidinobenzylpenicillin

To a stirred suspension of 21.6 grams of 6-aminopenicillanic acid in 100 ml. of methylene chloride is added a solution of 5 grams of diazomethane in 150 ml. of ether. When the evolution of nitrogen is complete, the mixture is filtered to remove any unreacted 6-aminopenicillanic acid and the filtrate containing methyl-6-aminopenicillanate is evaporated to a residue comprising methyl-6-aminopenicillanate. This residue is dissolved in 75 ml. of methanol to which is added a solution of 3.5 grams of oxalic acid to form the oxalate salt of 6-aminopenicillanic acid methyl ester. The oxalate salt is precipitated by the addition of 100 ml. of ether, is recovered by filtration, washed and dried. M.P. 126–127° C.

The oxalate salt (0.275 g.) is neutralized by shaking with 1.5 ml. of 0.5 N sodium bicarbonate solution and the liberated 6-aminopenicillanic acid methyl ester extracted with methylene chloride. To the dry methylene chloride extract is added 0.2 gram of dicyclohexylcarbodiimide and 0.3 gram of α-guanidinophenylacetic acid hydrochloride to form the methyl ester of α-guanidinobenzylpenicillin hydrochloride. The reaction mixture is allowed to stand for about one-half hour, whereupon the dicyclohexylurea by-product precipitates and is removed by filtration, the product remaining dissolved in the filtrate. The product is recovered from the filtrate by precipitation with ether, followed by filtration.

In the foregoing procedure the methyl ester of 6-aminopenicillanic acid is replaced by the ethyl ester and the octyl ester of α-guanidinobenzylpenicillin.

EXAMPLE 19

Preparation of the allyl ester of α-guanidinobenzylpenicillin

Following the procedures of Example 17, 6-aminopenicillanic acid is reacted with allyl bromide and triethylamine in acetone. The resulting allyl ester of 6-aminopenicillanic acid is reacted with α-guanidinophenylacetic acid hydrochloride to form the allyl ester of α-guanidinobenzylpenicillin which is recovered as the hydrochloride for ethereal solution.

EXAMPLE 20

Preparation of diethylaminoethyl esters of α-guanidinopenicillins

In accordance with the procedure of Example 16, the D(−)α-guanidinobenzylpenicillin is replaced by a molar equivalent of α-guanidino-β-phenethyl-penicillin,
α-guanidinomethylpenicillin,
α-guanidinonaphthylmethylpenicillin,
α-guanidino-p-methoxybenzylpenicillin,
α-guanidinofurylmethylpenicillin,
α-guanidinocyclohexylmethylpenicillin,
α-guanidinoheptylpenicillin,
α-guanidino(3-thienyl)methylpenicillin,
α-guanidino(2-thienyl)methylpenicillin,
α-guanidino(4-pyridyl)methylpenicillin,
α-guanidino-p-chlorobenzylpenicillin, and
α-guanidino-2,6-dimethyloxybenzylpenicillin to produce the diethylaminoethyl esters of α-guanidino-β-phenethylpenicillin,
α-guanidinomethylpenicillin,
α-guanidinonaphthylmethylpenicillin,
α-guanidino-p-methoxybenzylpenicillin, α-guanidinofurylmethylpenicillin,
α-guanidinocyclohexylmethylpenicillin,
α-guanidinoheptylpenicillin,
α-guanidino(3-thienyl)methylpenicillin,
α-guanidino(2-thienyl)methylpenicillin,
α-guanidino(4-pyridyl)methylpenicillin,
α-guanidino-p-chlorobenzylpenicillin and
α-guanidino-2,6-dimethoxybenzylpenicillin.

EXAMPLE 21

Preparation of the phenacyl esters of α-guanidinopenicillins

Following the procedure of Example 17, the α-guanidinophenylacetic acid hydrochloride is replaced by an equivalent molar amount of α-guanidino-β-phenylpropionic acid hydrochloride,
α-guanidinoacetic acid hydrochloride,
α-guanidinonaphthylacetic acid hydrochloride,
α-guanidino-p-methoxyphenylacetic acid hydrochloride,
α-guanidinofurylacetic acid hydrochloride,
α-guanidino-octanoic acid hydrochloride,
α-guanidino(3-thienyl)acetic acid hydrochloride,
α-guanidino(2-thienyl)acetic acid hydrochloride,
α-guanidino(4-pyridyl)acetic acid hydrochloride,
or α-guanidino-p-chlorophenylacetic acid hydrochloride to produce, respectively, the phenacyl esters of α-guanidino-β-phenethylpenicillin,
α-guanidinomethylpenicillin,
α-guanidinonaphthylmethylpenicillin,
α-guanidino-p-methoxybenzylpenicillin,
α-guanidinofurylmethylpenicillin,
α-guanidinocyclohexylmethylpenicillin,
α-guanidinoheptylpenicillin,
α-guanidino(3-thienyl)methylpenicillin,
α-guanidino(2-thienyl)methylpenicillin,
α-guanidino(4-pyridyl)methylpenicillin and
α-guanidino-p-chlorobenzylpenicillin.

EXAMPLE 22

Preparation of the allyl esters of α-guanidinopenicillins

Following the procedure of Example 19, the α-guanidinophenylacetic acid hydrochloride is replaced by an equivalent molar amount of α-guanidino-β-phenylpropionic acid hydrochloride,
α-guanidinoacetic acid hydrochloride,
α-guanidinonaphthylacetic acid hydrochloride,
α-guanidino-p-methoxyphenylacetic acid hydrochloride,
α-guanidinofurylacetic acid hydrochloride,
α-guanidino-octanoic acid hydrochloride,
α-guanidino(3-thienyl)acetic acid hydrochloride,
α-guanidino(2-thienyl)acetic acid hydrochloride,
α-guanidino(4-pyridyl)acetic acid hydrochloride,
or α-guanidino-p-chlorophenylacetic acid hydrochloride to produce, respectively, the allyl esters of α-guanidino-β-phenethylpenicillin,
α-guanidinomethylpenicillin,
α-guanidinonaphthylmethylpenicillin,
α-guanidino-p-methoxybenzylpenicillin,
α-guanidinofurylmethylpenicillin,
α-guanidinocyclohexylmethylpenicillin,
α-guanidinoheptylpenicillin,
α-guanidino(3-thienyl)methylpenicillin,
α-guanidino(2-thienyl)methylpenicillin,
α-guanidino(4-pyridyl)methylpenicillin and
α-guanidino-p-chlorobenzylpenicillin.

EXAMPLE 23

Preparation of the acetonyl esters of α-guanidinopenicillins

Following the procedure of Example 17, 6-aminopenicillanic acid is stirred in triethylamine and acetone with a slight molar excess of bromoacetone for approximately 1 hour and the product, the acetonyl ester of 6-aminopenicillanic acid, recovered by filtration following removal of the triethylamine hydrobromide formed as a by-product of the reaction.

Following the procedures of Example 17 and replacing the phenacyl ester of 6-aminopenicillanic acid hydrochloride with the acetonyl ester described above, the acetonyl ester is reacted with an equimolar amount of α-guanidinophenylacetic acid hydrochloride,
α-guanidino-β-phenylpropionic acid hydrochloride,
α-guanidinoacetic acid hydrochloride,
α-guanidinonaphthylacetic acid hydrochoride,
α-guanidino-p-methoxyphenylacetic acid hydrochloride,
α-guanidinofurylacetic acid hydrochloride,
α-guanidino-octanoic acid hydrochloride,
α-guanidino(3-thienyl)acetic acid hydrochloride,
α-guanidino(2-thienyl)acetic acid hydrochloride,
α-guanidino(4-pyridyl)acetic acid hydrochloride,
or α-guanidino-p-chlorophenylacetic acid hydrochloride to produce, respectively, the acetonyl esters of α-guanidinobenzylpenicillin,
α-guanidino-β-phenethylpenicillin,
α-guanidinomethylpenicillin,
α-guanidinonaphthylmethylpenicillin,
α-guanidino-p-methoxybenzylpenicillin,
α-guanidinofurylmethylpenicillin,
α-guanidinocyclohexylmethylpenicillin,
α-guanidinoheptylpenicillin,
α-guanidino(3-thienyl)methylpenicillin,
α-guanidino(2-thienyl)methylpenicillin,
α-guanidino(4-pyridyl)methylpenicillin and
α-guanidino-p-chlorobenzylpenicillin.

EXAMPLE 24

Preparation of the carbethoxymethyl esters of α-guanidinopenicillins

Following the procedure of Example 17, 6-aminopenicillanic acid is stirred in triethylamine and acetone with a slight molar excess of ethylbromoacetate for approximately 1 hour and the product, the carbethoxymethyl ester of 6-aminopenicillanic acid, recovered by filtration following removal of the triethylamine hydrobromide formed as a by-product of the reaction.

Following the procedure of Example 17 and replacing the phenacyl ester of 6-aminopenicillanic acid hydrochloride with the carbethoxy methyl ester described above, the carbethoxymethyl ester is reacted with an equimolar amount of α-guanidinophenylacetic acid hydrochloride,
α-guanidino-β-phenylpropionic acid hydrochloride,
α-guanidinoacetic acid hydrochloride,
α-guanidinonaphthylacetic acid hydrochloride,
α-guanidino-p-methoxyphenylacetic acid hydrochloride,
α-guanidinofurylacetic acid hydrochloride,
α-guanidino-octanoic acid hydrochloride,
α-guanidino(3-thienyl)acetic acid hydrochloride,
α-guanidino(2-thienyl)acetic acid hydrochloride,
α-guanidino(4-pyridyl)acetic acid hydrochloride, or
α-guanidino-p-chlorophenylacetic acid hydrochloride to produce, respectively, the carbethoxymethyl esters of α-guanidinobenzylpenicillin,
α-guanidino-β-phenethylpenicillin,
α-guanidinomethylpenicillin,
α-guanidinonaphthylmethylpenicillin,
α-guanidino-p-methoxybenzylpenicillin,
α-guanidinofurylmethylpenicillin,
α-guanidinocyclohexylmethylpenicillin,
α-guanidinoheptylpenicillin,
α-guanidino(3-thienyl)methylpenicillin,
α-guanidino(2-thienyl)methylpenicillin,
α-guanidino(4-pyridyl)methylpenicillin and
α-guanidino-p-chlorobenzylpenicillin.

EXAMPLE 25

Preparation of the benzyl ester of 6-aminopenicillanic acid

To a mixture of 2.16 grams of 6-aminopenicillanic acid and 3 cc. of triethylamine in 20 cc. of acetone is added 1.2 ml. of benzyl bromide. The resulting reaction mixture is stirred at about 25° C. for one hour and then cooled in an ice bath, resulting in the precipitation of triethylamine hydrobromide. To the mixture is added a slight excess of glacial acetic acid to precipitate any unreacted triethylamine as the salt. The precipitated triethylamine acid salts are removed by filtration and the filtrate containing the desired product of the reaction, the benzyl ester of 6-aminopenicillanic acid, is poured into water. The resulting aqueous mixture is neutralized with sodium bicarbonate and the product ester extracted with ether. The ether extract containing the product is evaporated to remove the ether, yielding a syrupy product comprising the benzyl ester of 6-aminopencillanic acid which is identified by comparison of the infrared spectrum with the benzyl 6-aminopenicillanate obtained in accordance with the procedures of Example 1.

The in vitro antibacterial activity of 6-[D(—)α-guanidinophenylacetamido]-pencillanic acid was compared with benzylpenicillin (Penicillin G) in 24-hour tube dilution tests against staphylococci, streptococci and pneumococci. The Minimum Inhibitory Concentration (M.I.C.) of these two antibiotics against the pathogenic organisms is shown in the following table:

MINIMUM INHIBITORY CONCENTRATION mcg./ml.

| Organism | 6-[D(—)α-guanidinophenylacetamido]-penicillanic acid | Benzylpenicillin |
| --- | --- | --- |
| Staph. aureus Smith | .97 | .12 |
| Staph. aureus 2957 | 3.9 | 1,000 |
| Staph. aureus 3147 | 1.9 | 125 |
| Staph. aureus 3051 | 3.9 | 1,000 |
| Staph. aureus 3036 | 3.9 | 1,000 |
| Staph. aureus 3106 | 3.9 | 1,000 |
| Staph. aureus 3089 | 3.9 | 1,000 |
| D. pneumoniae I-37 | .06 | .03 |
| Strep. pyrogenes C-203 | .03 | .03 |

Various changes and modifications of this invention can be made and to the extent that such variations incorporate the spirit of this invention they are intended to be included within the scope of the appended claims.

What is claimed is:

1. A penicillin compound selected from the group of compounds of the formula:

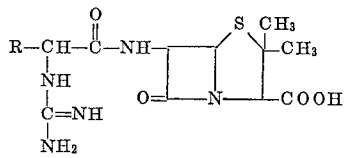

wherein R is selected from the group consisting of hydrogen, phenyl, benzyl, halophenyl, aminophenyl, alkanoylaminophenyl, loweralkoxyphenyl, loweralkyl, naphthyl, cyclohexyl, thienyl, pyridyl, pyrrolyl, furyl, non-toxic acid salts and esters thereof, said esters being selected from the class consisting of phenacyl, diethylaminoethyl, lower alkyl, benzyl, carbethoxymethyl and acetonyl.

2. α-Guanidinobenzylpenicillin.
3. 6-[D(—)α-guanidinophenylacetamido]-penicillanic acid.
4. α-Guanidino-β-phenethylpenicillin.
5. α-Guanidinomethylpenicillin.
6. α-Guanidinonaphthylmethylpenicillin.
7. α-Guanidino-p-methoxybenzylpenicillin.
8. α-Guanidinofurylmethylpenicillin.
9. α-Guanidinocyclohexylmethylpenicillin.
10. α-Guanidinoheptylpenicillin.
11. α-Guanidino(2-thienyl)methylpenicillin.
12. α-Guanidino(3-pyridyl)methylpenicillin.
13. α-Guanidino-p-chlorobenzylpenicillin.
14. α-Guanidino-p-aminobenzylpenicillin.
15. α-Guanidino-2,6-dimethoxybenzylpenicillin.
16. The benzyl ester of α-guanidinobenzylpenicillin.
17. Benzyl-6-aminopenicillanate.
18. The diethylaminoethyl ester of α-guanidinobenzylpenicillin.
19. The phenacyl ester of α-guanidinobenzylpenicillin.
20. The allyl ester of α-guanidinobenzylpenicillin.

References Cited

UNITED STATES PATENTS

| | | | |
| --- | --- | --- | --- |
| 3,173,911 | 3/1965 | Hoover | 260—239.1 |
| 3,174,964 | 3/1965 | Hobbs et al. | 260—239.1 |
| 2,941,995 | 6/1960 | Doyle et al. | 260—239.1 |
| 2,951,839 | 9/1960 | Doyle et al. | 260—239.1 |
| 3,157,673 | 11/1964 | Binningen et al. | 260—332.2 |
| 3,162,651 | 12/1964 | Binningen et al. | 260—332.2 |

FOREIGN PATENTS 810,569   3/1959   Great Britain.

NICHOLAS S. RIZZO, Primary Examiner.

U.S. Cl. X.R.

260—295, 326.3, 332.2, 347.3, 514, 518, 534; 424—271